United States Patent
Konishi

(10) Patent No.: US 10,055,670 B2
(45) Date of Patent: Aug. 21, 2018

(54) IMAGE RECOGNITION DEVICE, IMAGE SENSOR, AND IMAGE RECOGNITION METHOD USING FEATURE

(71) Applicant: OMRON Corporation, Kyoto-shi, Kyoto (JP)

(72) Inventor: Yoshinori Konishi, Seika-cho (JP)

(73) Assignee: OMRON Corporation, Kyoto-shi (JP)

( * ) Notice: Subject to any disclaimer, the term of this patent is extended or adjusted under 35 U.S.C. 154(b) by 78 days.

(21) Appl. No.: 15/121,886

(22) PCT Filed: Mar. 14, 2014

(86) PCT No.: PCT/JP2014/057003
§ 371 (c)(1),
(2) Date: Aug. 26, 2016

(87) PCT Pub. No.: WO2015/136714
PCT Pub. Date: Sep. 17, 2015

(65) Prior Publication Data
US 2017/0017862 A1    Jan. 19, 2017

(51) Int. Cl.
*G06K 9/00* (2006.01)
*G06K 9/62* (2006.01)
(Continued)

(52) U.S. Cl.
CPC ......... *G06K 9/6202* (2013.01); *G06K 9/4604* (2013.01); *G06K 9/6211* (2013.01);
(Continued)

(58) Field of Classification Search
None
See application file for complete search history.

(56) References Cited

U.S. PATENT DOCUMENTS

| 2009/0141984 | A1 | 6/2009 | Nakamura et al. |
| 2012/0301032 | A1* | 11/2012 | Kawanishi ........ G06F 17/30247 382/190 |
| 2016/0005156 | A1* | 1/2016 | Wang ....................... H04N 5/33 348/94 |

FOREIGN PATENT DOCUMENTS

JP    2009-116385 A    5/2009

OTHER PUBLICATIONS

Josef Sivic et al., "Video Google: A Text Retrieval Approach to Object Matching in Videos", The Ninth IEEE International Conference on Computer Vision, Oct. 13, 2003, 8 pages, vol. 2, IEEE Computer Society, Nice, France; Relevance is indicated in the European Search Report dated Nov. 17, 2017.

(Continued)

*Primary Examiner* — Idowu O Osifade
(74) *Attorney, Agent, or Firm* — Metrolexis Law Group, PLLC

(57) ABSTRACT

An image recognition device includes an identification unit configured to compare a feature point in an input image and a feature point in every model image to compute a first degree of similarity between the input image and the model image, and to identify the input image on the basis of said first degree of similarity. To compute the first degree of similarity for a model image, the identification unit adds to a score based on a matching feature point for each feature point in the model image matching a feature point in the input image. The score based on the matching feature point is a value that increases as the number of model images including the matching feature point decreases.

9 Claims, 14 Drawing Sheets

(51) Int. Cl.
　　　*G06K 9/46*　　　(2006.01)
　　　*G06T 7/00*　　　(2017.01)
(52) U.S. Cl.
　　　CPC ......... *G06K 9/6215* (2013.01); *G06K 9/6292* (2013.01); *G06T 7/001* (2013.01); *G06T 2207/30164* (2013.01)

(56) References Cited

OTHER PUBLICATIONS

Stephen O'Hara et al., "Introduction to the Bag of Features Paradigm for Image Classification and Retrieval", Jan. 2011, 25 pages, arxiv.org; Relevance is indicated in the European Search Report dated Nov. 17, 2017.

Salim Chitroub, "Classifier combination and score level fusion: concepts and practical aspects", International Journal of Image and Data Fusion, Jun. 2010, pp. 113-135, vol. 1, No. 2, Taylor & Francis; Relevance is indicated in the European Search Report dated Nov. 17, 2017.

The new European search report dated Nov. 17, 2017, which replaces the previous search report of Oct. 2, 2017, in the counterpart European patent application.

* cited by examiner

Acquired image

Result of detecting work piece

Result of type classification

FIG. 8

| | Input Image Feature Points | MODELS | | | | | | Number of Models | Weighted Score |
|---|---|---|---|---|---|---|---|---|---|
| | | ● | ●●<br>● | ●<br>●●<br>● | ●<br>● ●<br>● | ●<br>●●●<br>● | ●●●<br>●●● | | |
| 1 | ○○●<br>○○○ | × | ○ | ○ | ○ | ○ | ○ | 5 | 20 |
| 2 | ●○○<br>○●○ | × | × | × | ○ | ○ | ○ | 3 | 33 |
| 3 | ○○○<br>○●○ | ○ | × | ○ | × | ○ | × | 3 | 33 |
| 4 | ○○○<br>○○● | × | × | × | ○ | ○ | ○ | 3 | 33 |
| 5 | ○●○<br>○○○ | × | ○ | ○ | ○ | ○ | ○ | 5 | 20 |

| Input Image | Models | | | | | | |
|---|---|---|---|---|---|---|---|
| | | • | •<br>• • | •<br>• •<br>• | • •<br>• • | • •<br>•<br>• • | • • •<br>• • • |
| | Simple Similarity Score | 100 | 100 | 100 | 100 | 100 | 67 |
| • •<br>•<br>• • | Weighted Similarity Score | 24<br>(33) | 29<br>(40) | 53<br>(73) | 76<br>(106) | 100<br>(139) | 76<br>(106) |
| | Recognition Score | 124 | 129 | 153 | 176 | 200 | 143 |

FIG. 10(A)

| Input Image | Models | • | ∴ | ∴• | ::  | ::· | ::: |
|---|---|---|---|---|---|---|---|
| • | Simple Similarity Score | 100 | 0 | 33 | 0 | 20 | 0 |
| | Weighted Similarity Score | 100 (33) | 0 (0) | 100 (33) | 0 (0) | 100 (33) | 0 (0) |
| | Recognition Score | 200 | 0 | 133 | 0 | 120 | 0 |

FIG. 10(B)

| Input Image | Model | • | ∴ | ∴• | :: | ::· | ::: |
|---|---|---|---|---|---|---|---|
| ∴ | Simple Similarity Score | 0 | 100 | 67 | 50 | 40 | 33 |
| | Weighted Similarity Score | 0 (0) | 100 (40) | 100 (40) | 100 (40) | 100 (40) | 100 (40) |
| | Recognition Score | 0 | 200 | 167 | 150 | 140 | 133 |

FIG. 10(C)

| Input Image | Model | • | ∴ | ∴• | :: | ::· | ::: |
|---|---|---|---|---|---|---|---|
| ∴• | Simple Similarity Score | 100 | 100 | 100 | 50 | 60 | 33 |
| | Weighted Similarity Score | 45 (33) | 55 (40) | 100 (73) | 55 (40) | 100 (73) | 55 (40) |
| | Recognition Score | 145 | 155 | 200 | 105 | 160 | 88 |

FIG. 11(A)

| | Models | ⚀ | ⚁ | (3) | (4) | ⚄ | ⚅ |
|---|---|---|---|---|---|---|---|
| Input Image (4) | Simple Similarity Score | 0 | 100 | 67 | 100 | 80 | 67 |
| | Weighted Similarity Score | 0 (0) | 38 (40) | 38 (40) | 100 (106) | 100 (106) | 100 (106) |
| | Recognition Score | 0 | 138 | 105 | 200 | 180 | 167 |

FIG. 11(B)

| | Models | ⚀ | ⚁ | (3) | (4) | ⚄ | ⚅ |
|---|---|---|---|---|---|---|---|
| Input Image (6) | Simple Similarity Score | 0 | 100 | 67 | 100 | 80 | 100 |
| | Weighted Similarity Score | 0 (0) | 13 (40) | 13 (40) | 35 (106) | 35 (106) | 100 (306) |
| | Recognition Score | 0 | 113 | 80 | 135 | 115 | 200 |

IMAGE RECOGNITION DEVICE, IMAGE SENSOR, AND IMAGE RECOGNITION METHOD USING FEATURE

FIELD

The present invention relates to identifying an image on the basis of feature points in the image.

BACKGROUND

Sensor devices can measure and inspect items conveyed along the production line (hereafter, work piece(s)), and are thus quite popular in factory automation (FA). These sensor devices are typically referred to as image sensors or visual sensors. An image sensor can be configured as a camera and an image processing device. The image sensor matches a pre-registered teaching object (hereafter a "model" or a "pattern") to detect a work piece in an image, and to extract the required information or perform a measurement. The output from the image sensor may be used for various purposes, such as recognizing, inspecting, or sorting the work piece.

An increasingly popular production format in FA involves conveying a plurality of different types of work pieces mixed together on the same line and applying different kinds of processes based on the type of work piece. For instance, different types of work pieces flow randomly on a conveyor on a production line purposed for packaging an assortment of products. Picker robots then pick up, correctly position, and pack different categories of work pieces. Furthermore, a high-variety low-volume line can manufacture a product series where the specifications such as the shape, size, or color of the work pieces differ slightly; here, the processing method, the inspection requirements, or the like may differ for each specification.

An image sensor must be capable of correctly determining the type of work piece on a production line flowing a mix of a plurality of different types of work pieces (hereafter, a "mixed flow production line") to allow different types of processes to be performed on different types of work pieces. In order to use template matching to classify work pieces, a plurality of types of model images are registered in the image sensor in advance. The type of work piece can be estimated by obtaining the model image that best matches the work piece image.

Here are some problems with recognizing images of a plurality of similar types of models differing, for instance, by color or shape. In template matching, a similarity score is calculated by determining the degree to which the feature points in model image match the feature points in the input image.

Consider using object recognition to recognize the faces of a six-sided die with the images of the six-sided die (FIG. 12). As illustrated in FIG. 12, a plurality of models is given a perfect score (a degree of similarity of 100) when performing recognition on an input image showing the side of the die with five pips. Thus the recognition result for the input image is based on noise. In this way, the degrees of similarity provide no distinction because some of the model images are subsets of each other (containment), or many of the model images have large intersections between them. In other words, it tends to be difficult to properly identify an object using the typical degree of similarity concept in template matching when a number of the model images are similar.

Japanese Patent Publication No. 2009-116385 (Patent Document 1) proposes calculating mutual correlation values for similar model images. The locations of the feature points with a low correlation are recorded, and only those feature points are used to calculate the degree of similarity. Thus, proper recognition is possible even when there are model images that are similar because the degree of similarity is calculated using only feature points having a low correlation.

Despite that, the method proposed in Japanese Patent Publication No. 2009-116385 requires this correlation computation for all combinations of the similar model images. The number of combinations increases (by $(O(n^2))$) when many of the model images are similar and thus the issues surrounding processing speed and memory usage remain unresolved. Moreover, recognition is multi-leveled and is carried out on a one-to-one basis. An increased number of similar models increase the recognition depth and thus increases processing time by $O(n \log n)$.

RELATED ART DOCUMENTS

Patent Documents

Patent Document 1: Japanese Unexamined Patent Application Publication No. 2009-116385

SUMMARY

Technical Problem

In light of the foregoing, embodiments of the invention provide a method of image recognition that has a low processing load and that is capable of highly accurate recognition even when including similar model images.

Solution to Problem

Embodiments of the invention therefore establish a weight for each feature point on the basis of the saliency of the feature point in a model image, and calculate a degree of similarity that takes this weight into account.

More specifically, an image recognition device according to one aspect of the invention includes a storage unit configured to store a feature point for each model image among a plurality of model images; a feature point extractor configured to extract a feature point from an input image; and an identification unit configured to compare a feature point in an input image and a feature point in every model image to compute a first degree of similarity (also referred to hereafter as a "weighted degree of similarity") between the input image and the model image, and to identify the input image on the basis of said first degree of similarity. The identification unit computes the first degree of similarity for a model image by adding to a score based on a matching feature point for each feature point in the model image matching a feature point in the input image; and the score based on the matching feature point is a value that increases as the number of model images including said matching feature point decreases.

A feature point with few matching model images can be considered to have a high saliency, and to be highly distinguishable from other models. On the other hand, a feature point matching a number of model images can be considered to have a low saliency and not particularly useful for discrimination. Accordingly, an image recognition device according to embodiments of the invention establishes a weighted score so that the higher the saliency of a feature point, the higher the weighted score, and performs image recognition based on a first degree of similarity which is a combination of the weighted scores. Hereby, recognition can be accurately performed even when many of the model images are similar.

In this aspect of the invention, the weighted score can be obtained for the feature points included in the input image during image recognition; a weighted score can also be stored for the feature points in a model image during model image registration.

To obtain a weighted score during image recognition, the number of model images with a matching feature point can be acquired for each feature point in the input image, and the weighted score computed based on the number of matching model images. To obtain a weighted score during model image registration, the number of model images with a matching feature point can be acquired for all the feature points in a model image, and the weighted score computed based on the number of matching model images. Note that a weighted score can be computed using any specific method of computation if the weighted score is computed to increase as the number of matching model images decreases. For instance, the weighted score can be a value based on the reciprocal for the number of matching model images. The weighted score can also be a value based on the difference between the total number of model images and the number of matching model images.

In another aspect of the invention, image recognition may be performed also taking into account a degree of similarity computed from criteria different from the above-mentioned first degree of similarity. For instance, the identification unit may compute a second degree of similarity (also referred to hereafter as a "simple degree of similarity") for each model image in the plurality of model images based on the proportion of the feature points in the model image included among the feature points in the input image, and select the model image best matching the input image on the basis of the first degree of similarity and the second degree of similarity.

The first degree of similarly and the second degree of similarity may be used in various ways when implementing a specific recognition method. For instance, a simple sum or a weighted sum is taken of the first degree of similarity and the second degree of similarity for a model image. The model image with the highest total can be determined as the model image best matching the input image. Alternatively, the model image with the highest first degree of similarity among the model images with a high second degree of similarity can be determined as the model image best matching the input image. Note that model images with a high second degree of similarity can simply be a predetermined number of model images with high degrees of similarity, or can be the model images that have a second degree of similarity between a maximum value and a predetermined threshold.

In this manner, recognition may be carried out on the basis of a first degree of similarity and a second degree of similarity. Hereby, the correct recognition can take place even if correct recognition could not take place on the basis of only the first or the second degree of similarity.

Note that the invention may be implemented as an image recognition device or an object classification device having at least a portion of the above mentioned features. The invention may also be implemented as an image sensor containing a camera that captures images of objects, and an image processing device. The invention may also be implemented as an image processing method including at least a portion of the above-described processes; furthermore, this image processing method may be implemented as a computer program for execution on a computer, or as a computer readable medium with the computer program permanently recorded thereon. The above-mentioned configurations and processes may be freely combined with each other insofar as is technically possible to configure the invention.

Effects

Embodiments of the present invention provide highly accurate recognition with low processing load even when there are similar models.

BRIEF DESCRIPTION OF THE DRAWINGS

FIG. 8 is for describing the weighted score used for each feature points during type classification;

FIG. 9 is an example of computing a recognition score during the type classification process;

FIGS. 10(A) to 10(C) are examples of computing a recognition score during the type classification process;

FIGS. 11(A) and 11(B) are examples of computing a recognition score during the type classification process.

DETAILED DESCRIPTION

The invention relates to a method of image recognition where images (i.e., template images) are registered in advance. Template matching is performed on an input image and the registered image that most closely matches the input image is output. This method may be used in object identification, such as in FA image sensors, in computer vision, or in machine learning. The method may also be applied to content-based image retrieval where a query image is used to detect and output similar images from within an image database. What follows is a description of one preferable application, namely, an FA image sensor that implements aspects of the invention. The FA image sensor detects and categorizes each work piece on a mixed flow production line whereon a plurality of different types of work pieces are conveyed mixed together.

The Image Sensor

The overall configuration and applicable situations for an image sensor according to an embodiment of the invention is described with reference to FIG. 1. The image sensor 1 can be installed on a production line. The image sensor system captures an image of a production item (work piece 2) and identifies the type of work piece 2 using the image obtained. Note that the image sensor 1 may be provided with various other image processing functions, such as detecting edges, scratches, or dirt, or measuring the area, length or center of gravity as needed.

Figure 1:
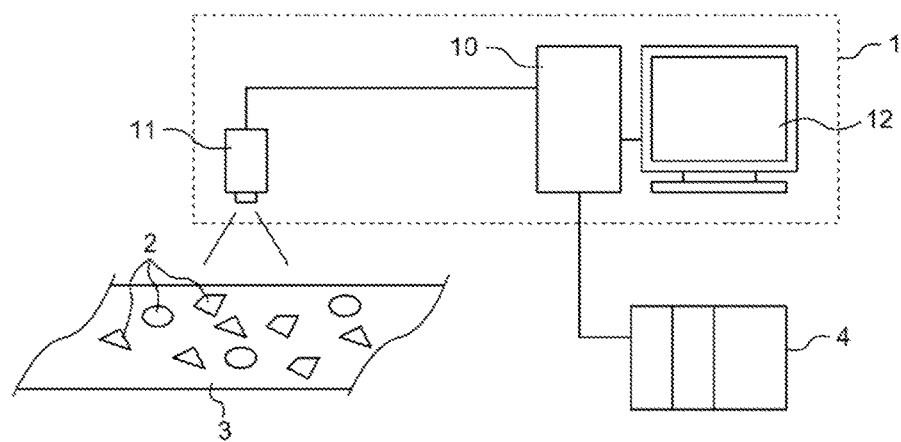
FIG. 1 illustrates an overall configuration of an image sensor.

As illustrated in FIG. 1, a mix of a plurality of different types of work pieces 2 flows on a conveyor 3. The image sensor 1 acquires an image from the camera 11 periodically, or on receiving a trigger signal sent from a programmable logic controller (PLC) 4. The image processing device 2 (image recognition device) detects the work pieces 2 contained in the image, executes processing such as type classification and the like, and shows the result on a display 4, or outputs the result to an external device such as the PLC 4. The PLC 4 controls manufacturing devices such as the image sensor 1, the conveyor 3, and production robots (not shown).

Hardware Configuration of the Image Sensor

Figure 2:
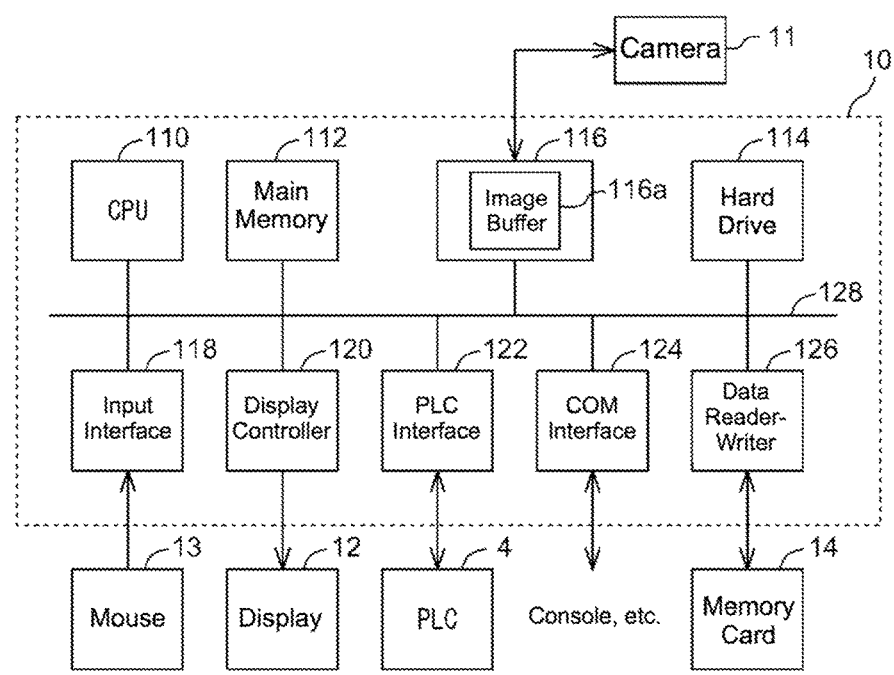
FIG. 2 illustrates a hardware configuration of the image sensor.

A hardware configuration for the image sensor 1 is described with reference to FIG. 2. An image sensor 1 may be configured from a camera 11 and an image processing device 10.

The camera 11 acquires images for the image processing device 10. A complementary metal-oxide-semiconductor (CMOS) camera or a charge-coupled device (CCD) camera can be suitably used for the camera 2. Any desired format (in terms of resolution, color or monochrome, still or video, gradient, and in terms of the data type, and the like) may be used for the input image. The format for the input image may be selected as appropriate according to the type of work piece 2 or the objective for using sensing. The appropriate camera may be selected when special non-visible light images, such as x-ray or thermal images, or information such as depth (distance) and the like are to be used for inspection.

The image processing device 10 includes a central processing unit (CPU) 110; a main memory 112 and a hard drive 114 as storage units; a camera interface 116; an input interface 118; a display controller 120; a PLC interface 122; a communication interface 124; and a data reader-writer 126. Each of these components is capable of mutual data communication via a bus 128.

The camera interface 116 mediates data transmission between the CPU 110 and the camera 11, and includes an image buffer 116a for temporarily storing image data from the camera 11. The input interface 118 mediates data transmission between the CPU 110 and an input device such as a mouse 13, a keyboard, a touchscreen panel, a jog controller and the like. The display controller 120 is connected to a display 12 such as a liquid crystal monitor, and controls what is shown on the display 12. The PLC interface 122 mediates the data transmission between the CPU 110 and the PLC 4. The communication interface 124 mediates data transmission between the CPU 110 and a console (or, a personal computer, a server device, or the like). The data reader-writer 126 mediates the data transmission between the CPU 110 and the memory card 14, which is a recording medium.

The image processing device 10 can be configured from a general purpose computer whereby the CPU 110 reads and executes a program stored on the hard drive 114 or the memory card 14 to provide the various desired functions. This kind of program is run while stored on a computer readable recording medium such as the memory card 14 or an optical disc.

When implementing the image processing device 10 through a general-purpose computer, an operating system (OS) may be installed to provide the computer with basic functions, in addition to an application installed to provide functions according to the embodiment. In this case the program provided according to the embodiment may use program modules provided by the OS to realize the desired functions. Note that a program according to the embodiment may be provided as a standalone application program, or may be provided as a module within another program. Finally, these functions may be replaced in whole or in part by a dedicated hardware circuit.

Image Processing Device Functions

Figure 3:
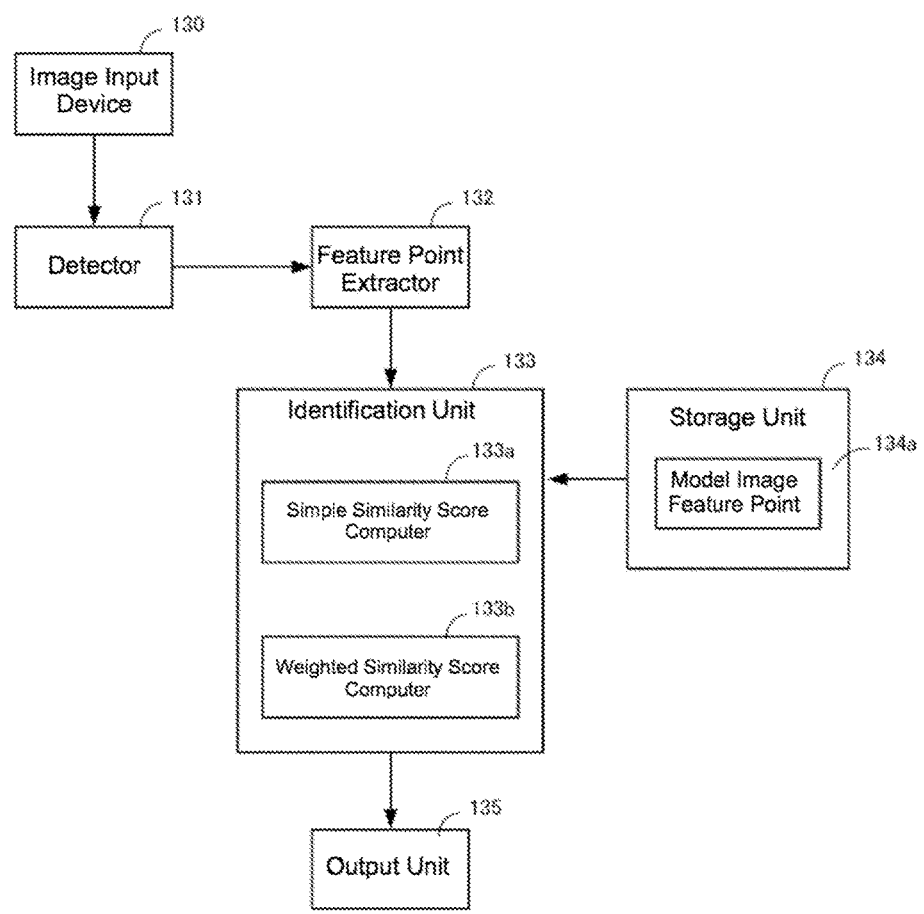
FIG. 3 illustrates the type classification function in the image recognition device.

FIG. 3 illustrates the type classification (object classification) functions provided in the image processing device. The image processing device 10 is provided with an image input unit 130, a detector 131, a feature point extractor 132, an identification unit 133, a storage unit 134, and an output unit 135. These functional blocks are implemented by executing a computer program on the CPU 110 in the image processing device 10.

The storage unit 134 stores the feature points (model image feature points 134a) extracted from an image of a model for a plurality of models. In the embodiment, a feature point represents a point or region in an image exhibiting large changes between shading values, such as edges and corners. The feature points may also be based on color or shape. For instance, blue, yellow, or red values, or the number of lines or circles may be adopted as a feature point. Additionally, a feature point representing a large change in shading value, or a feature point representing a color may be combined. The image processing device 10 receives a model image and extracts model image feature points 134a from the model image. Alternatively, another device may extract the model image feature points. The image processing device 10 may then receive and store the data relating to the model image feature points in the storage unit 134.

Image Processing Device: Operations

Figure 4:
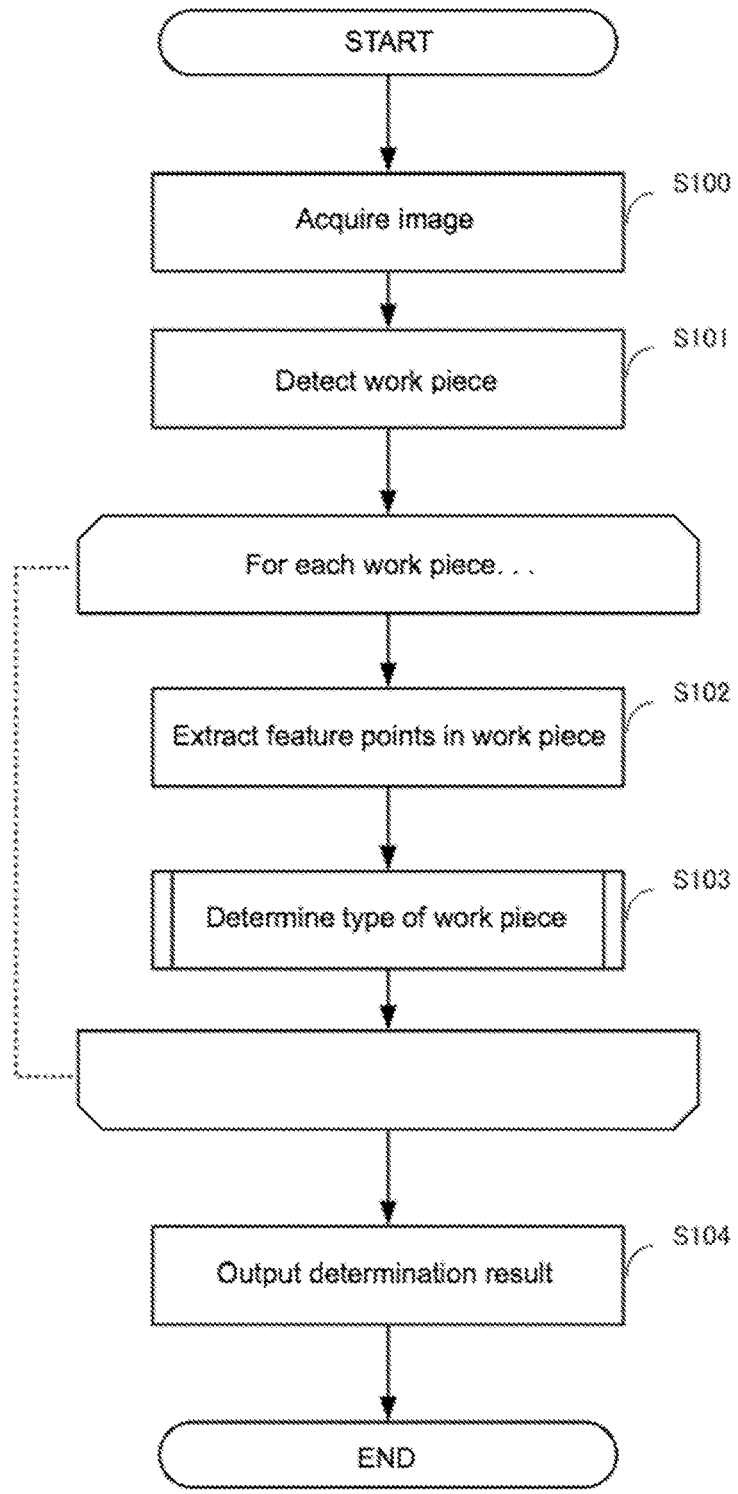
FIG. 4 is a flowchart of the type classification process.

The image processing device 10 acquires images of the work pieces 2 flowing on the conveyor 3, and detects or classifies the work pieces 2. FIG. 4 is a flowchart of the overall image recognition process run by the image processing device 10. The functions in the image recognition process are described referring to the flowchart in FIG. 4. An overview of the type classification process is also provided with reference to the flowchart in FIG. 4.

Figure 5A:
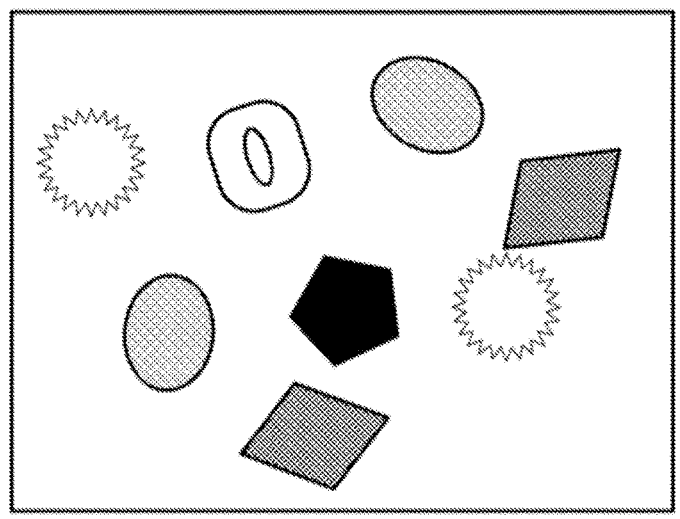
FIG. 5(A) shows an example of an acquired image.

On receiving input of a trigger signal from the PLC 4, the image input unit 130 acquires an image from the camera 11 (step S100). FIG. 5(A) is an example of an image acquired by the image processing device. As illustrated, there are five types of objects (an assortment of chocolates) flowing mixed together on the conveyor.

Figure 5B:
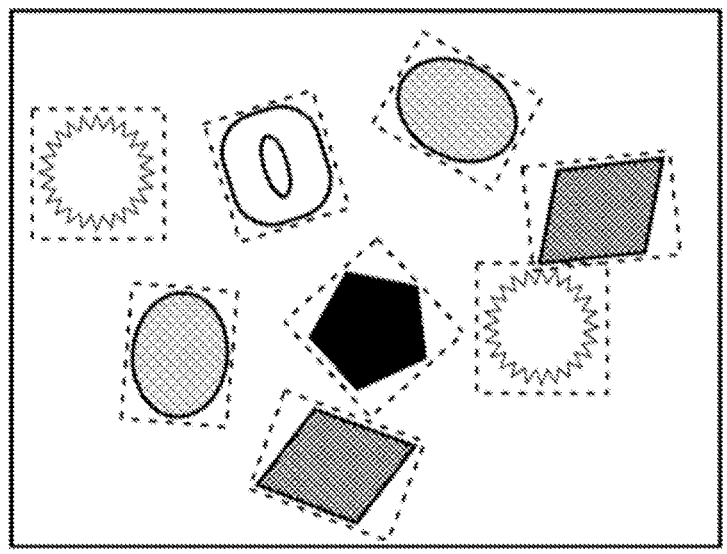
FIG. 5(B) shows an example of the detection results for a work piece.

Next, the detector 131 detects the individual work pieces 2 in the input image (step S101). Any kind of algorithm may be used for detection. For instance, the background may be removed by converting the image to a binary image, and a region (pixel group) larger than a predetermined area detected as a work piece 2. Otherwise, a work-piece-like region can be detected using pattern matching. The detector 131 may also perform preprocesses, such as smoothing or noise removal, on the input image as needed. FIG. 5(B) illustrates an example of a detection result. Here, the regions including a work piece detected from the image are depicted with dotted lines.

The feature point extractor 132 then analyzes the image including the detected work pieces (hereafter, a work piece image), and extracts feature points (step S102). A feature point is a point or a region within an image exhibiting large changes between shading values. For instance, edges or corners may be extracted as feature points.

Figure 5C:
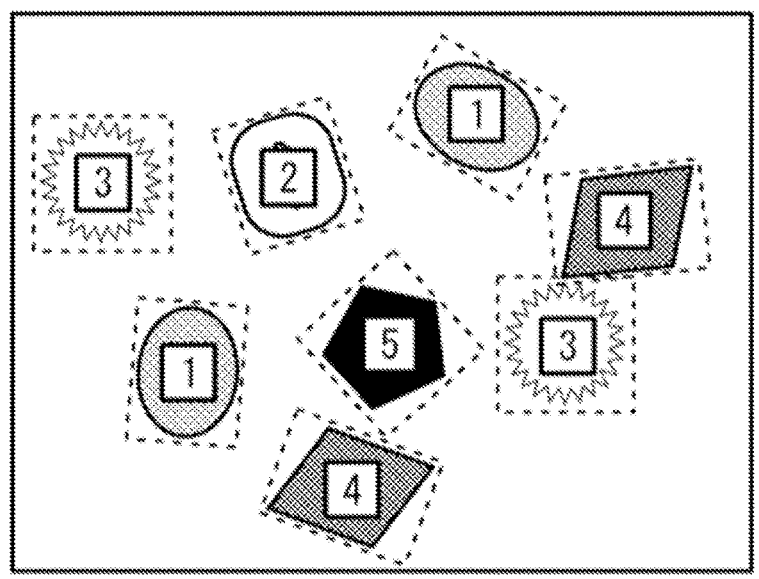
FIG. 5(C) shows an example of the results of the type classification.

The identification unit 133 determines the type of work piece by comparing the feature points of a work piece with the feature points in each of the plurality of model images stored in the storage unit 134 (step S103). Steps S102 and S103 are repeated for all work pieces detected in step S101 to classify each of the work pieces. FIG. 5(C) illustrates an example of a detection result. The identification result (classification) of each of the work pieces is depicted with a number from 1 to 5. The results of the classification are output to the display 12 or to the PLC 4 via the output unit 135 (step S104).

Figure 6:
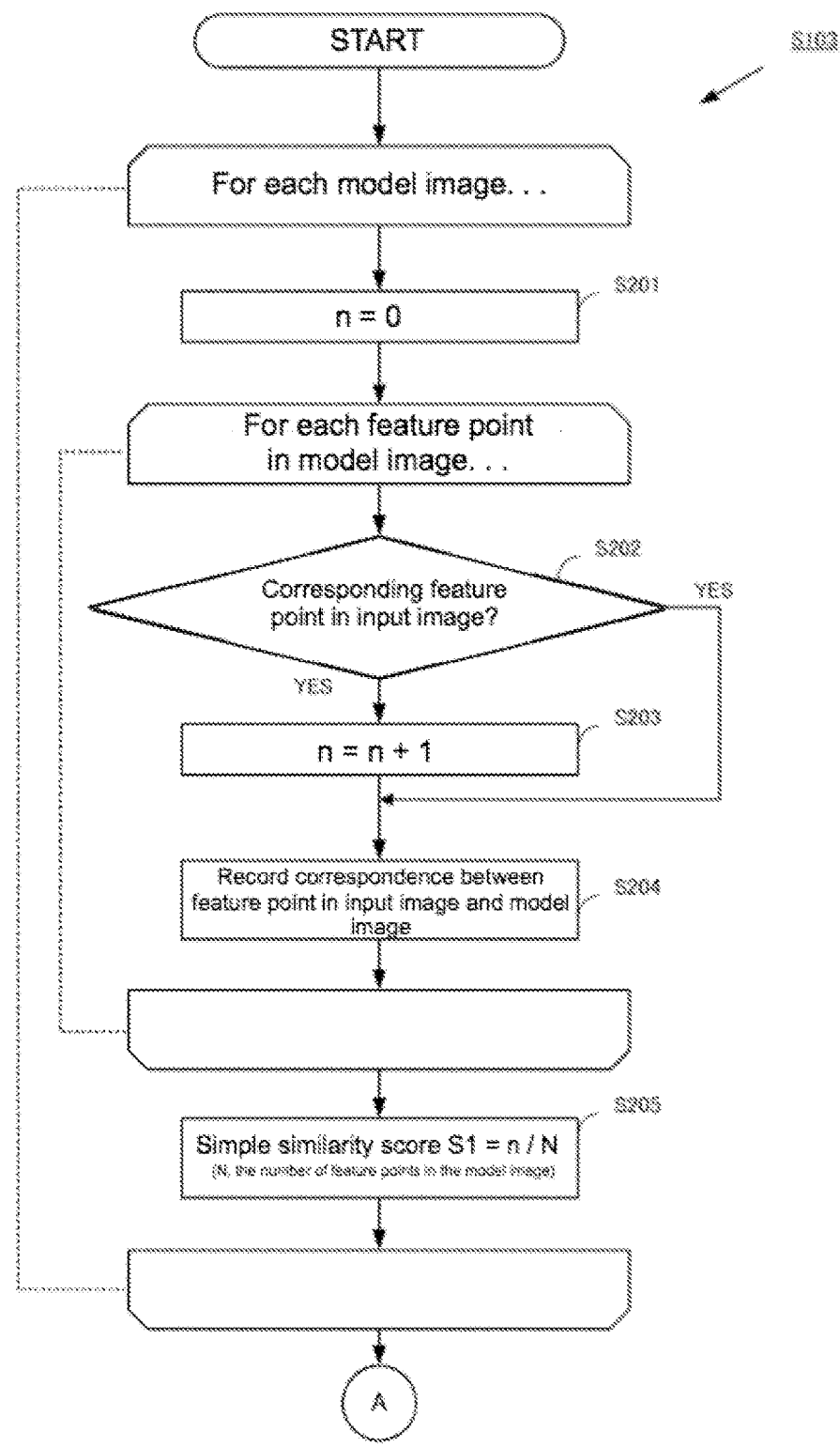
FIG. 6 details the flow in the type classification process.
Figure 7:
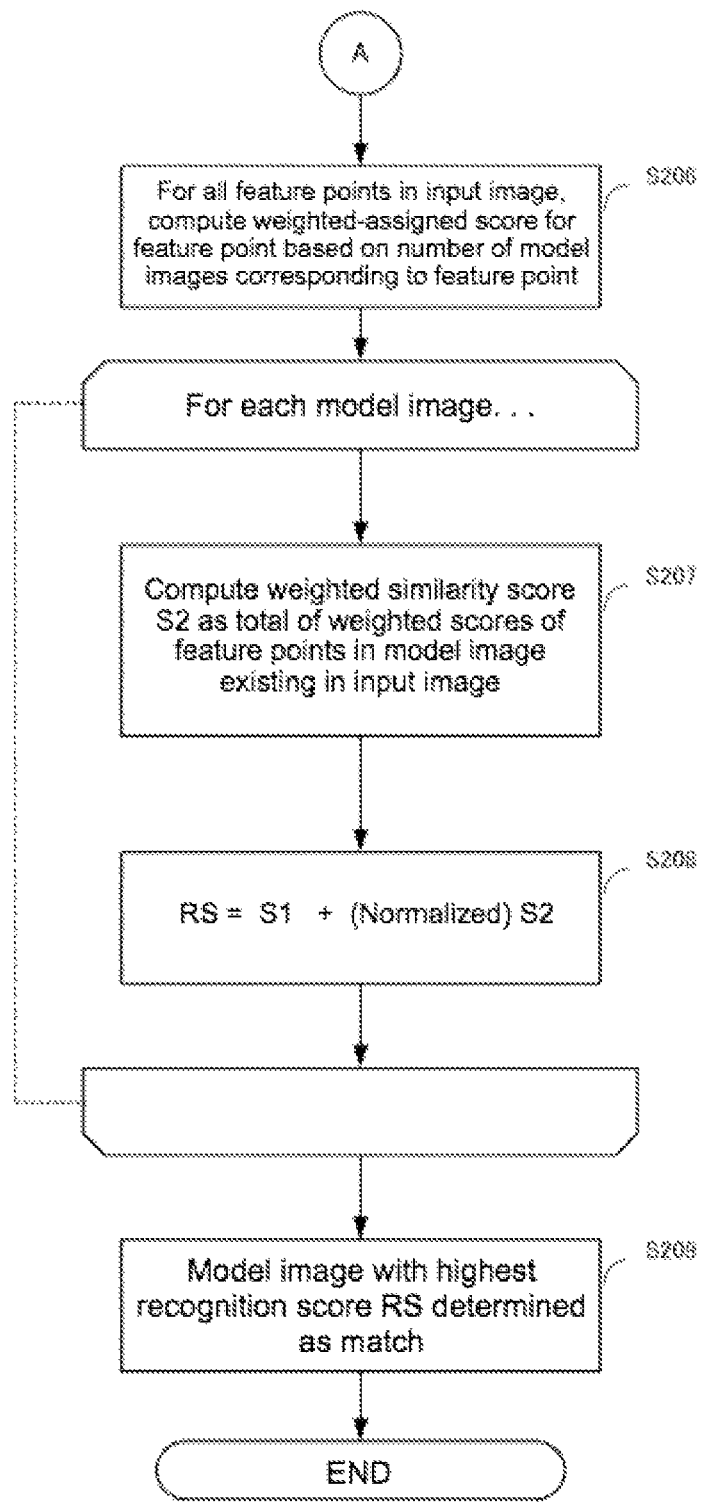
FIG. 7 details the flow in type classification process.

FIG. 6 and FIG. 7 depict the process in step S103 in detail. In this process, two similarity scores are used to identity the work piece: a simple similarity score S1 based on the simple number of matches between the feature points in the work piece image and the feature points in the model image (i.e., the second degree of similarity); and a weighted similarity score S2 which takes into account a weighted score depending on the saliency of each feature point (i.e., the first degree of similarity).

First, the recognition process loops through step S201 to step S205. This loop determines to what degree the feature points in the current model image are included in the work piece image, to thereby compute a simple similarity score S1 for each of the model images.

When processing starts on a new model image, a simple similarity score computer 133a in the identification unit 133 initializes a variable (match counter) n to zero to represent the number of matching feature points (step S201). The simple similarity score computer 133a determines whether or not a corresponding feature point exists in the work piece image (step S202), and increments the match counter n when a corresponding feature point exists (step S203). The above-mentioned process is repeated for all feature points in the model image. Thereafter, the simple similarity score computer 133a computes the simple similarity score S1 as a proportion of the number of corresponding feature points n in a work piece image to the total number of feature points N in the model image (S205).

As illustrated in FIG. 9, consider using object recognition to identify each face of a six-sided die, where an image of a face of the die is learned as a model. For simplicity, each black circle (i.e., pip) of the die is assumed to be a feature point, and the square outline of the die is ignored as an image feature. Assume here, that the work piece image is an image of the side of the die displaying five pips. Thus, five feature points are extracted from this work piece image.

The model image showing one pip on the die has a single feature point; this feature point exists entirely within the work piece image, and therefore the model image is given a simple similarity score S1 of 100 (i.e., n/N times 100; with the perfect score being 100). Similarly, the model images showing two through five pips also have a simple similarity score S1 of 100. However, when examining the model image showing six pips, only four of the six feature points are included in the work piece image, and thus, the model image showing six pips is given a simple similarity score S1 of 67.

As above described, the simple similarity score computer 133a checks whether or not a feature point corresponding to a feature point in the model image exists in the work piece image. During this process the simple similarity score computer 133a notes the correspondence relationship between the work piece image and the model images. In other words, whether or not the feature points in the work piece image exist in the model images (step S204). This determination is described with reference to FIG. 8. When the work piece image is an image showing five pips of the die, five feature points are extracted from the work piece image. As depicted in the column 300 in FIG. 8, assume each of the feature points are numbered 1 to 5, e.g., the feature point 1 is the pip (dot) in the top left of the die face. When comparing the work piece image to the model image showing three pips, the feature points 1, 3, 5 in the work piece image have a corresponding feature point in the model image. Therefore, in step S204, the fact that the model image showing three pips includes the feature points 1, 3, 5 of the work piece image (FIG. 8), but not the feature points 2, 4 is recorded. Note that in FIG. 8, a circle indicates a corresponding feature point, and an "x" indicates there are no corresponding feature points. Once steps S201 to S205 are iterated for all the model images and the correspondence relationships recorded, a correspondence relationship 301 is obtained for the work piece image and all the model images (FIG. 8). That is, a correspondence relationship between the feature points in the work piece image and the feature points in the model images is acquired.

Once the looping of steps S201 to S205 is complete, the weighted similarity score computer 133b in the identification unit 133 computes a weighted score in accordance with the number of corresponding model images for each of the feature points in the work piece image (step S206, FIG. 7). As illustrated in FIG. 8, the weighted similarity score computer 133b obtains a count 302 of the model images containing the current feature point and computes weighted score 303 for each of the feature points in the work piece image in accordance with the count 302 taken as the reciprocal. For example, the feature point in the model image showing five pips is included in five model images (i.e., in the model images showing two, three, four, five, and six pips). Therefore, the weighted score for the feature point 1 is computed as 100/5=20. The feature point 2 is included in three model images (i.e., the model images showing four, five, and six pips). Therefore the weighted score for the feature point 2 is computed as 100/3=33. Thus, a weighted score 302 is calculated for all the feature points in the work piece image in this manner. Above, the weighted score is computed from the reciprocal for the number of corresponding model images, i.e., from a value in accordance with said number. However, note that any desired method of determination can be used if the weighted score is a value that increases as the number of models decreases. The weighted score for a feature point may also be a monotonically decreasing function where the number of model images including the current feature point is a variable in that function. For instance, the weighted score can be a value based on the difference between the total number of model images and the number of model images including the feature point (i.e., this may be the actual difference, or a ratio of the difference to the overall count, or the like). In the example illustrated in FIG. 8, the weighted score of the feature point 1 could be calculated as 6-5=1, or (6-5)/6× 100=16.

It can be said that a feature point commonly found in a number of models has low saliency and contributes little to image recognition. Conversely, it can be said that a feature point common to a few model images has high saliency, and contributes greatly to image recognition. Consequently, a similarity score can be computed taking into account the saliency of the feature point by establishing a weighted score such that the feature points used in a few models have a higher weighted score.

Next, the weighted similarity score computer 133b uses the above-mentioned weighted score to compute a weighted similarity score S2 between the work piece image and each of the model images. More specifically, the weighted similarity score S2 is computed as the total of the weighted scores of the feature points in the model image existing in the work piece image (S207). As illustrated in FIG. 8 only the feature point 3 matches in the model image showing one pip. The weighted score for the feature point 3 is 33; therefore the weighted similarity score S2 between the work piece image (i.e., the image of the die displaying five pips) and the model image showing one pip is 33. The feature points 1, 5 match in the model image showing two pips. The weighted score for each feature point 1, 5 is 20; therefore the weighted similarity score S2 between the work piece image (i.e., the image of the die displaying five pips) and the model image showing two pips is a total of 40. The weighted similarity score in relation to all model images is calculated in this manner.

The identification unit 133 computes a degree of similarity (a recognition score) between a work piece image and each of the model images on the basis of the simple similarity score S1 obtained in step S205 and the weighted similarity score S2 obtained in step S207 (S208). The weighted similarity scores S2 are normalized so that the maximum of the weighted similarity scores S2 is 100. After normalization, the sum of the weighted similarity score S2 and the simple similarity score S1 is taken as the recognition score.

FIG. 9 depicts a case where the work piece image is of the side of the die showing five pips, as well as the simple similarity score S1 and the weighted similarity score S2 between the work piece image and each of the model images. In the table, a normalized weighted similarity score S2 is shown as is, while the weighted similarity score S2 obtained in step S207 is shown in brackets.

The identification unit 133 identifies the model image with the highest recognition score as the model image best matching the work image and identifies the type of work piece (S209). In the example illustrated in FIG. 9, the model image for five pips has the highest recognition score and thus the work piece image is classified as being the model image of five pips (i.e. the image showing the side of the die having five pips).

FIGS. 10(A) to 10(C), and FIGS. 11(A) and 11(B) illustrate the simple similarity scores, weighted similarity scores, and recognition scores computed when the images of sides one through four, and six are provided as input images. As illustrated in FIG. 10(C), and FIG. 11(A), 11(B), when the input images show sides three, four, and six of the die, it is difficult to differentiate using only the simple similarity score, and correct recognition is difficult. However, correct recognition is possible when the recognition score is used, which takes the weighted similarity score into account. Additionally, although the weighted similarity score for a plurality of models is identical for input images showing side one and side two of the die, there is a large difference in the simple similarity scores, which is enough to make recognition possible. As illustrated by this example, there are cases where recognition is impossible if only a simple similarity score or only a weighted similarity score is used; however, combining these similarity scores makes coned recognition possible.

Figure 12:
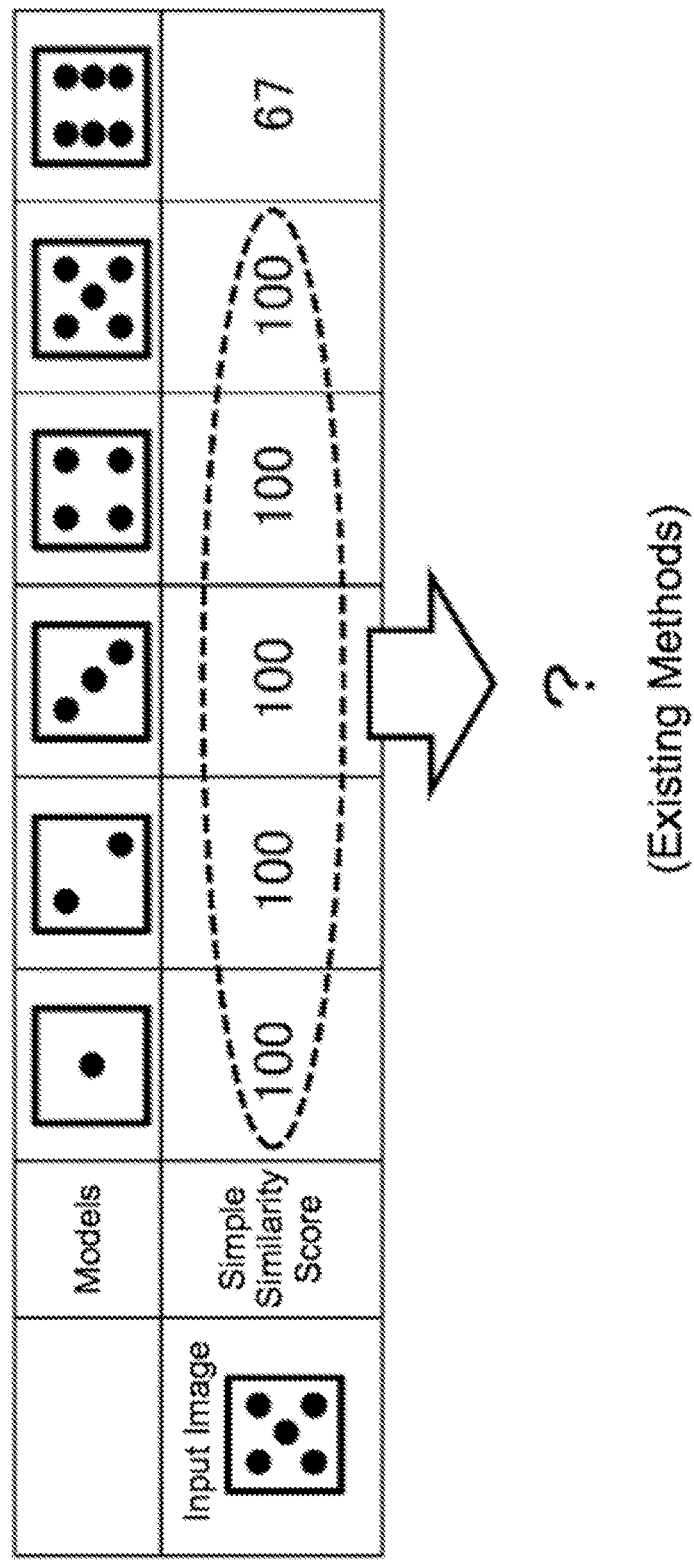
FIG. 12 is for describing the problems with existing recognition techniques.

The above method makes correct recognition possible, even in the kinds of cases depicted in FIG. 12 where correct recognition cannot take place with template matching based on only a simple similarity score. As illustrated in FIG. 9, FIGS. 10(A) to 10(C), and FIGS. 11(A) and 11(B), correct recognition is possible because of the marked difference between even the highest recognition scores and the second highest recognition scores. A correct model yields a high value from both simple similarity score and the weighted similarity score. For all other models at least one of the simple similarity score and the weighted similarity score computes to low value. Accordingly, there is enough of a difference between the above described recognition scores for a correct model and all other models. Thus, because of the large difference in recognition scores between a correct model and all other models, the correct recognition can still take place even with noise or distortion in the input image.

The method described herein involves recording the correspondence relationship between feature points in the model images and feature points in an input image. This correspondence relationship is the basis for computing a weighted score and a weighted similarity score. Consequently, these steps are implemented in addition to an existing template matching technique when adopting the method described herein. As such, there is negligent increase to the processing load. The demands on the processing time and memory do not increase remarkably, as is the case in Patent Document 1, even with a number of model images that are similar. However, there is little change in terms of the processing time and memory requirements compared to existing methods (i.e., methods computing only a simple similarity score).

Modification Examples

The above described embodiment is merely one specific example of the invention. The scope of the invention is not limited to this specific example. The invention may adopt various specific configurations insofar as those configurations do not depart from the technical concepts of the invention. For example, the above-mentioned embodiment provides an example of adopting the invention in an object classification device; however, the invention is not limited to this implementation. Preferably, the invention is also adopted in a content-based image retrieval device, or the like.

In the above description, the recognition score is obtained by a simple addition of the simple similarity score and the weighted similarity score. However, these two similarity scores may be combined in predetermined ratios to compute recognition score (i.e., the recognition score may be a weighted sum). In this case the proportion of the weighting may be a predetermined value, or maybe a value set by the user.

Further, an object may be classified using the simple similarity score and the weighted similarity score, without computing a recognition score. For instance, first a predetermined number of model images with a high simple similarity score are selected. The model image with the highest weighted similarity score is then determined as the model image matching the input image. Note that model images with high simple similarity scores can simply be a predetermined number of model images with the high simple similarity scores, or can be the model images that have a simple similarity score between a maximum value and a predetermined threshold. In this case the threshold can be designated as the absolute value of the score or maybe designated as a proportion of the maximum value.

In the above embodiment, identification takes place on the basis of both a simple similarity score and a weighted similarity score. However, identification may take place on the basis of only the weighted similarity score. As above described, although there are cases where correct classification cannot take place when using only the weighted similarity score, correct classification is possible even when the images entered have simple similarity scores that do not provide enough distinction for recognition.

In the above embodiment, a weighted score is computed for each of the feature points when matching the input image. However, the weighted score may be computed when the model images are registered. That is, a process identical to the above-described weighted score computation is carried out with each model image as an input image. Hereby, a weighted score can be computed for each of the feature points in a model image. When a feature point in the input image matches a feature point in the model image during object recognition, the weighted scores for those feature points are combined to compute a weighted similarity score similarly to the process above described. This produces the same effect as the above-described embodiment.

The above embodiment provides an example of image recognition carried out on a two-dimensional (planar) image. However, the invention is applicable to image recognition carried out on a three-dimensional (stereoscopic) image wherein depth information is added. In this case, both the model images and the input images are captured using a range-finding image pickup device such as a stereo camera and the like; the processes identical to those described above are then performed. Furthermore, according to aspects of the invention, the saliency of a feature point can be taken into account during the recognition process. Such a recognition process is applicable, not only to still images, but is similarly applicable to chronological data such as video, and speech data.

REFERENCE NUMERALS

1 Image sensor
2 Work piece
3 Conveyor
4 PLC
10 Image processing device
11 Camera
12 Display
130 Image input device
131 Detector
132 Feature point extractor
133 Identification unit
134 Storage unit
135 Output unit

The invention claimed is:

1. An image recognition device comprising:
a memory configured to store a feature point for each model image among a plurality of model images;
a processor configured with a program to perform operations comprising:
operation as a feature point extractor configured to extract a feature point from an input image; and
operation as an identification unit configured to compare a feature point in an input image and a feature point in every model image to compute a first degree of similarity between the input image and the model image, and to identify the input image on the basis of said first degree of similarity; wherein
the processor is configured with the program to perform operations such that operation as the identification unit further comprises operation as the identification unit that computes the first degree of similarity for a model image by adding to a score based on a matching feature point for each feature point in the model image matching a feature point in the input image; and
the score based on the matching feature point is a value that increases as the number of model images including said matching feature point decreases.

2. The image recognition device according to claim 1, wherein the processor is configured with the program to perform operations such that operation as the identification unit further comprises operation as the identification unit that computes the score based on a matching feature point in the model image for each feature point in the model image by obtaining the number of model images with a feature point matching a given feature point in the input image and computing the score on the basis of said number of model images.

3. The image recognition device according to claim 1, wherein the processor is configured with the program to perform operations such that operation as the identification unit further comprises operation as the identification unit that computes the score based on a matching feature point in the model image for each feature point in the plurality of model images in advance by obtaining the number of model images with a feature point matching a given feature point in the plurality of model images and computing the score on the basis of said number of model images.

4. The image recognition device according to claim 1, wherein the processor is configured with the program to perform operations such that operation as the identification unit further comprises, for each model image in the plurality of model images, operation as the identification unit that computes a second degree of similarity based on the proportion of the feature points in said model image included among the feature points in the input image, and selects the model image best matching the input image on the basis of the first degree of similarity and the second degree of similarity.

5. The image processing device according to claim 4, wherein the processor is configured with the program to perform operations such that operation as the identification unit further comprises operation as the identification unit that selects the model image with the largest one of a simple sum and a weighted sum of the first degree of similarity and the second degree of similarity as the model image best matching the input image.

6. The image processing device according to claim 4, wherein the processor is configured with the program to perform operations such that operation as the identification unit further comprises operation as the identification unit that selects the model image with the largest the first degree of similarity among the model images with a large second degree of similarity as the model image best matching the input image.

7. An image sensor comprising: a camera configured to capture an image of an object, and an image recognition device according to claim 1 configured to classify the object from an image input from the camera, and to output the result.

8. An image recognition method for identifying a model image matching an input image, the image recognition method comprising: causing a computer having a memory configured to store a feature point for each model image among a plurality of model images, to execute operations comprising:
extracting a feature point from an input image; and
comparing a feature point in an input image and a feature point in every model image to compute a first degree of similarity between the input image and the model image, and identifying the input image on the basis of said first degree of similarity; wherein during the identification of the input image on the basis of said first degree of similarity, the first degree of similarity for a model image is computed by adding to a score based on a matching feature point for each feature point in the model image matching a feature point in the input image; and the score based on the matching feature point is a value that increases as the number of model images including said feature point decreases.

9. A non-transitory computer-readable medium storing a program configured for execution on a computer, the program causing the computer to execute the image recognition method according to claim 8.

\* \* \* \* \*

UNITED STATES PATENT AND TRADEMARK OFFICE
CERTIFICATE OF CORRECTION

PATENT NO. : 10,055,670 B2
APPLICATION NO. : 15/121886
DATED : August 21, 2018
INVENTOR(S) : Yoshinori Konishi It is certified that error appears in the above-identified patent and that said Letters Patent is hereby corrected as shown below:

On the Title Page

(54) The title of Invention should be corrected to show "IMAGE RECOGNITION DEVICE, IMAGE SENSOR, AND IMAGE RECOGNITION METHOD USING FEATURE POINTS."

Signed and Sealed this
Ninth Day of October, 2018

Andrei Iancu
*Director of the United States Patent and Trademark Office*